United States Patent
Lim

(10) Patent No.: US 8,340,473 B2
(45) Date of Patent: Dec. 25, 2012

(54) APPARATUS AND METHOD OF INTERPOLATING IMAGE USING REGION SEGMENTATION

(75) Inventor: Il Soon Lim, Hongseong-gun (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 980 days.

(21) Appl. No.: 12/379,434

(22) Filed: Feb. 20, 2009

(65) Prior Publication Data

US 2010/0074558 A1    Mar. 25, 2010

(30) Foreign Application Priority Data

Sep. 22, 2008 (KR) .................. 10-2008-0092708

(51) Int. Cl.
*G06K 9/32* (2006.01)
*G06K 9/46* (2006.01)

(52) U.S. Cl. ........................ 382/300; 382/195
(58) Field of Classification Search .................. 382/190, 382/195, 199, 201, 300; 348/448–452
See application file for complete search history.

(56) References Cited

U.S. PATENT DOCUMENTS

| | | | | |
|---|---|---|---|---|
| 7,126,643 | B2 * | 10/2006 | Song et al. | 348/448 |
| 7,149,355 | B2 * | 12/2006 | Kubota | 382/199 |
| 2005/0036711 | A1 * | 2/2005 | Abe | 382/300 |
| 2007/0002154 | A1 * | 1/2007 | Kang et al. | 348/272 |

FOREIGN PATENT DOCUMENTS

| | | |
|---|---|---|
| JP | 2002-319020 | 10/2002 |
| JP | 2005-63197 | 3/2005 |
| KR | 10-2004-0054052 | 6/2004 |

* cited by examiner

*Primary Examiner* — Yon Couso
(74) *Attorney, Agent, or Firm* — Staas & Halsey LLP

(57) ABSTRACT

An apparatus and a method of interpolating an image via a region division are provided. To improve an image quality artifact around an edge, the apparatus to interpolate the image may determine whether an inputted image corresponds to an edge after performing a thinning process with respect to a gradient value of the inputted image, and convert a resolution of the image using optimal location information via a region division and a pixel replacement according to an interpolation direction of the image.

20 Claims, 15 Drawing Sheets

● PIXEL OF INPUTTED IMAGE
○ INTERPOLATION PIXEL

FIG. 8

|        | 1 | 2 | 3 | 4 | 5 | 6 |
|--------|---|---|---|---|---|---|
| (i−1,j) | * | * | * | * | N | E |
| (i,j)   | N | E | E | E | N | N |
|         | ○ | ○ | ○ | ○ | ○ | ○ |
| (i+1,j) | N | E | N | N | E | E |
| (i+2,j) | * | * | N | E | * | * |

* : DON'T CARE

N : NON-EDGE PIXEL

E : EDGE PIXEL

○ : INTERPOLATION PIXEL

● PIXEL OF INPUTTED IMAGE
○ INTERPOLATION PIXEL

◯ : DON'T CARE

Ⓝ : NON-EDGE PIXEL

Ⓔ : EDGE PIXEL

○ : INTERPOLATION PIXEL

APPARATUS AND METHOD OF INTERPOLATING IMAGE USING REGION SEGMENTATION

CROSS-REFERENCE TO RELATED APPLICATIONS

This application claims the benefit of Korean Patent Application No. 10-2008-0092708, filed on Sep. 22, 2008, in the Korean Intellectual Property Office, the disclosure of which is incorporated herein by reference.

BACKGROUND

1. Field

Example embodiments relate to a method of interpolating an image for resolution conversion of the image, and more particularly, to a technique generating a high resolution image by effectively using local information of an inputted image.

2. Description of the Related Art

Recently, as various display devices having various resolutions are released in the market, conversion operations capable of converting a resolution of an inputted image into the resolution being able to be serviced in the display devices are required.

In general, a resolution conversion technique may include, for example, a reconstruction-based method, a method using a linear filtering technique, and a method using a non-linear filtering technique.

When a low resolution image is converted into a high resolution image, a serious image quality artifact may occur in an edge area. As examples of an image quality artifact, there are a jaggedness phenomenon in which jagged patterns occur in an edge area of the image as a result of resolution conversion, a blurring phenomenon in which clarity artifacts occur due to the resolution conversion, an aliasing phenomenon in which aliasing occur in the edge area due to the artifact of filter characteristics, etc. Consequently, a process for the edge area is important when converting a resolution.

Accordingly, a new technique capable of reconstructing an image and improving an image quality via precise processes for an edge area is required when converting a low resolution image into a high resolution image.

SUMMARY

Additional aspects and/or advantages will be set forth in part in the description which follows and, in part, will be apparent from the description, or may be learned by practice of the invention.

The foregoing and/or other aspects are achieved by providing an apparatus to interpolate an image including: a gradient calculation unit calculating a gradient value of each pixel of an inputted image; an edge determination unit determining whether the pixel corresponds to an edge by using the gradient value; an interpolation direction determination unit determining an interpolation direction according to a location of a pixel to be interpolated within an interpolation window when a pixel corresponding to an edge is determined to exist in the interpolation window; a pixel replacement unit dividing the interpolation window according to the interpolation direction based on the pixel to be interpolated and replacing a pixel value within the divided interpolation window; and an interpolation performance unit interpolating the pixel to be interpolated using the replaced pixel value.

Here, the edge determination unit may determine whether the pixel corresponds to an edge based on a comparison result of the horizontal gradient value and the vertical gradient value.

The pixel replacement unit may include: a diagonal region division unit dividing the interpolation window into quadrants based on the pixel to be interpolated when the interpolation direction is diagonal; and a diagonal direction pixel replacement unit classifying a pixel included in each of the quadrants according to whether the pixel corresponds to an edge into one of a participant pixel and a non-participant pixel, and replacing a pixel value of the non-participant pixels using a pixel value of the participant pixels.

The pixel replacement unit may include: a vertical region division unit dividing a portion of the interpolation window in a vertical direction based on the pixel to be interpolated when the interpolation direction is determined to be vertical; and a vertical direction pixel replacement unit replacing a pixel value of a pixel within the divided interpolation window using a pixel value of an adjacent pixel.

The pixel replacement unit may include: a horizontal region division unit dividing a portion of the interpolation window in a horizontal direction based on the pixel to be interpolated when the interpolation direction is determined to be horizontal; and a horizontal direction pixel replacement unit replacing the pixel value of the pixel within the divided interpolation window using the pixel value of the adjacent pixel.

The foregoing and/or other aspects are achieved by providing a method of interpolating an image, including: calculating a gradient value of each pixel of the inputted image; determining an interpolation direction according to a location of a pixel to be interpolated within an interpolation window when a pixel corresponding to an edge is determined to exist in the interpolation window based on the gradient value; dividing the interpolation window according to the interpolation direction based on the pixel to be interpolated, and replacing a pixel value within the interpolation window; and interpolating the pixel to be interpolated using the replaced pixel value.

The foregoing and/or other aspects are achieved by providing a method of interpolating an inputted image, the method including: calculating a gradient value of each pixel of the inputted image; determining whether each pixel corresponds to an edge according to the gradient value; replacing pixel values within an interpolation window based on a location of a pixel to be interpolated pixel within the interpolation window when at least one pixel is determined to correspond to an edge; and interpolating the pixel to be interpolated using the replaced pixel values.

BRIEF DESCRIPTION OF THE DRAWINGS

These and/or other aspects and features of embodiments will become apparent and more readily appreciated from the following description, taken in conjunction with the accompanying drawings of which:

FIG. 8 is a diagram illustrating operations of a vertical direction pixel replacement unit of FIG. 4;

DETAILED DESCRIPTION OF EMBODIMENTS

Figure 1:
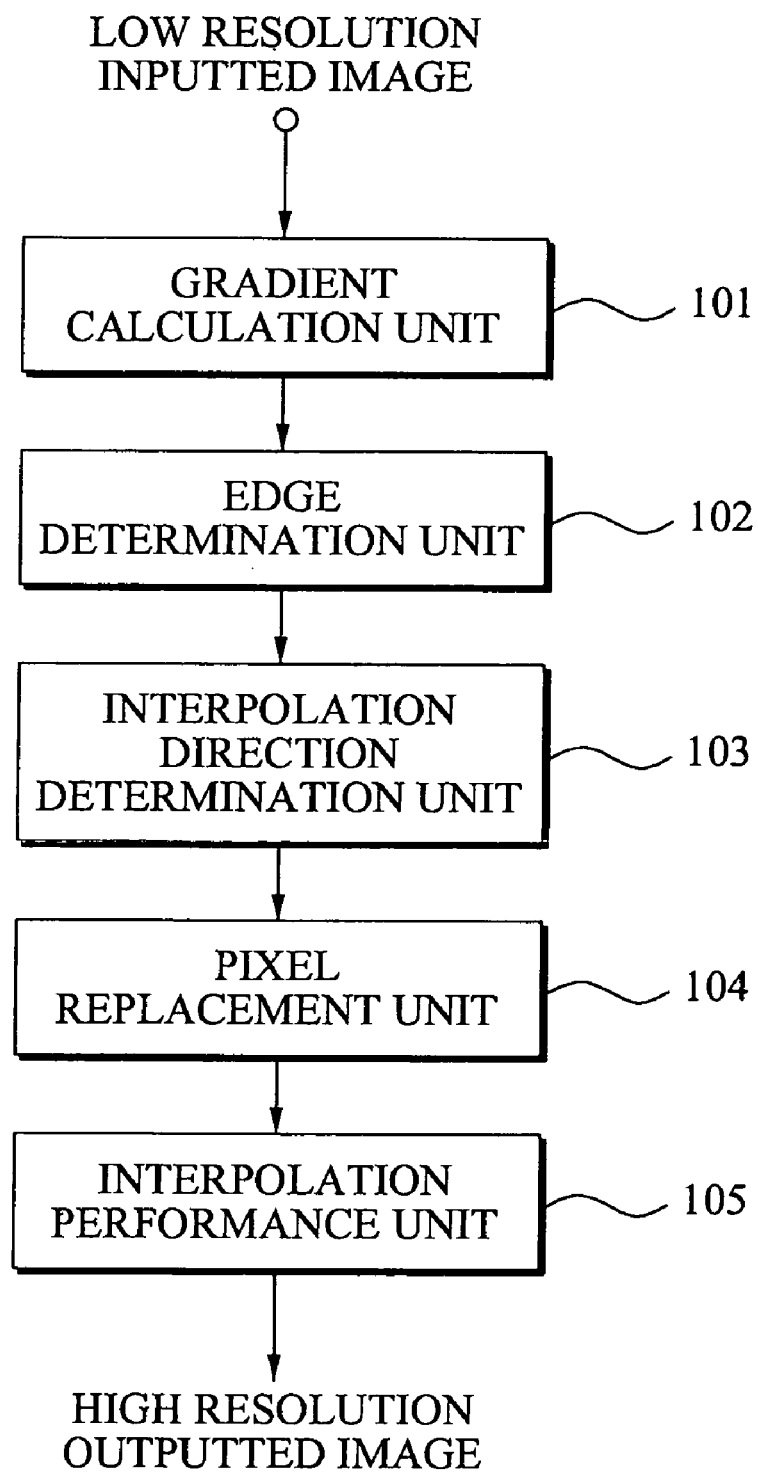
FIG. 1 is a diagram illustrating an apparatus to interpolate an image according to embodiments.

Reference will now be made in detail to the embodiments, examples of which are illustrated in the accompanying drawings, wherein like reference numerals refer to the like elements throughout. Embodiments are described below to explain the present disclosure by referring to the figures.

FIG. 1 is a diagram illustrating an apparatus to interpolate an image according to embodiments.

Referring to FIG. 1, the apparatus to interpolate the image may include a gradient calculation unit 101, an edge determination unit 102, an interpolation direction determination unit 103, a pixel replacement unit 104, and an interpolation performance unit 105.

The gradient calculation unit 101 may calculate a gradient value G of each pixel with respect to inputted images.

Figure 2:
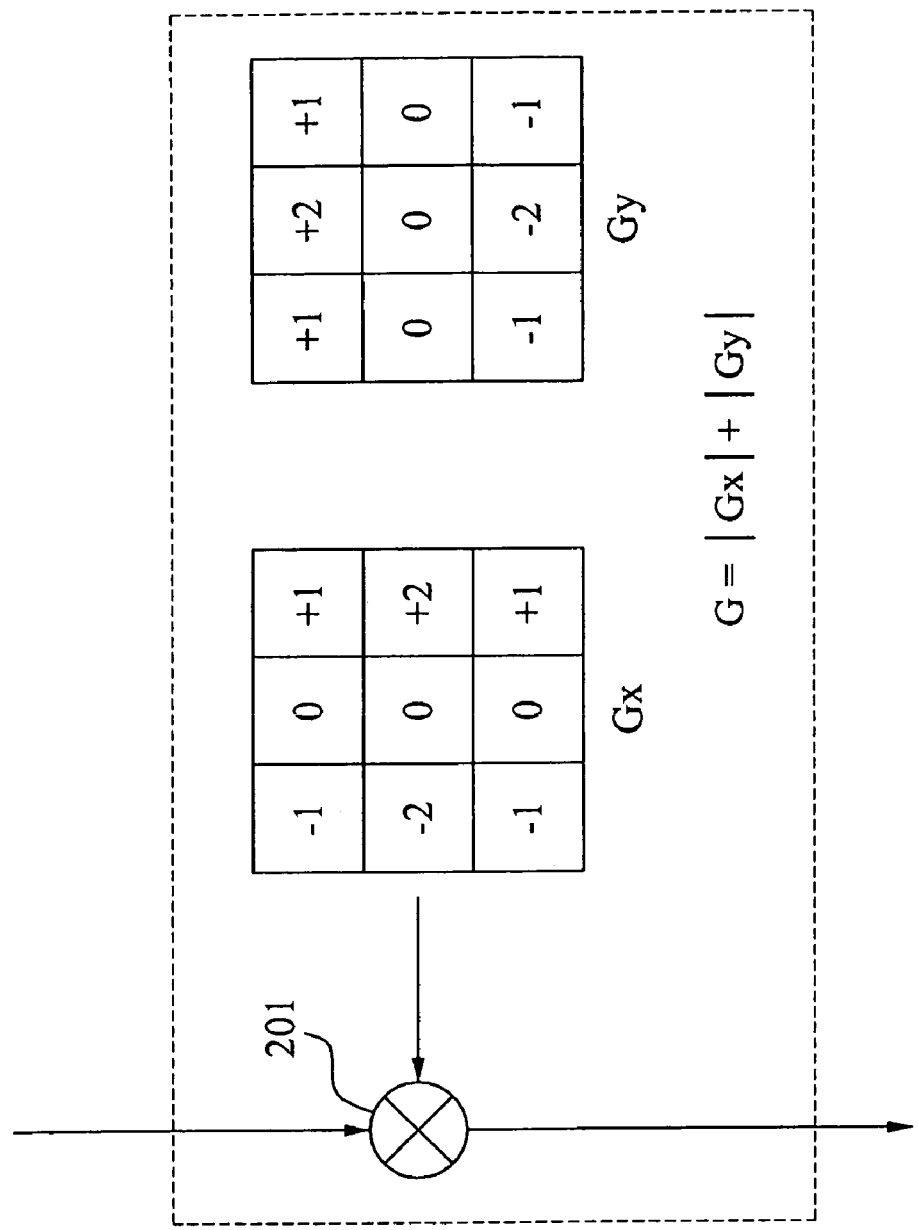
FIG. 2 is a diagram illustrating a gradient calculation unit of FIG. 1.

FIG. 2 is a diagram illustrating the gradient calculation unit 101 of FIG. 1.

Referring to FIG. 2, the gradient calculation unit 101 may use a gradient filter 201 to calculate a gradient value G of each pixel. In this instance, a Sobel filter may be used as the gradient filter 201. As an example, the gradient calculation unit 101 may calculate after calculating a horizontal gradient value Gx and a vertical gradient value Gy with respect to each pixel via the gradient filter 201. The gradient value G of a corresponding pixel may be calculated based on a sum of absolute values of the horizontal gradient value Gx and the vertical gradient value Gy.

The gradient value G may be defined by, $$G=|Gx|+|Gy|.$$ [Equation 1]

The edge determination unit 102 of FIG. 1 may determine whether a corresponding pixel corresponds to an edge using a gradient value G of each pixel. The edge determination unit 102 may determine whether the gradient value G corresponds to an edge after performing a thinning process with respect to the gradient value G of each pixel.

The edge determination unit 102 may determine whether the corresponding pixel corresponds to the edge with respect to each pixel based on a comparison result of the horizontal gradient value Gx and the vertical gradient value Gy.

The edge determination unit 102 may determine a gradient value G as a non-edge when the gradient value G of a pixel is equal to or greater than a threshold T determined in advance and when the gradient value G satisfies at least one other condition at the same time.

As an example, when, as a first condition, the gradient value G of a pixel is equal to or greater than a threshold T, and when, as a second condition, a horizontal gradient value Gx is equal to or greater than a vertical gradient value Gy, the edge determination unit 102 may determine a corresponding pixel as an edge when, as a third condition the horizontal gradient value Gx is equal to or greater than gradient values of a left pixel and a right pixel which are adjacent to the corresponding pixel. Here, the edge determination unit 102 may determine the corresponding pixel as the edge when, as a fourth condition, the horizontal gradient value Gx is equal to or greater than each horizontal gradient value of the left pixel and the right pixel by at least a set value V, which is set in advance.

When, as the first condition, the gradient value G of the pixel is equal to or greater than the threshold T, and when, as a fifth condition, the vertical gradient value Gy is greater than the horizontal gradient value Gx, the edge determination unit 102 may determine the corresponding pixel as an edge when, as a sixth condition, the vertical gradient value Gy is equal to or greater than a gradient value of an upper pixel and a lower pixel of the corresponding pixel. Here, the edge determination unit 102 may determine the corresponding pixel as the edge when, as a seventh condition, the vertical gradient value Gy is equal to or greater than each vertical gradient value of the upper pixel and the lower pixel by the set value V.

That is, the edge determination unit 102 may finally determine the corresponding pixel as the edge when the corresponding pixel satisfies all of the second condition through the fourth condition or satisfies both the fifth condition and the seventh condition, as well as satisfying the first condition.

As described above, the edge determination unit 102 may prevent a thick edge from occurring via a thinning process based on both a horizontal gradient value and a vertical gradient value without immediately determining a gradient value of a pixel. Consequently, a degrading of the input image which may occur in an edge area may be minimized.

The interpolation direction determination unit 103 may determine whether a pixel corresponding to an edge exists within an interpolation window and may determine an interpolation direction according to a location of a pixel (hereinafter, this is referred to as an 'interpolation pixel') to be interpolated within the interpolation window when an energy exists in the interpolation window.

Figure 3:
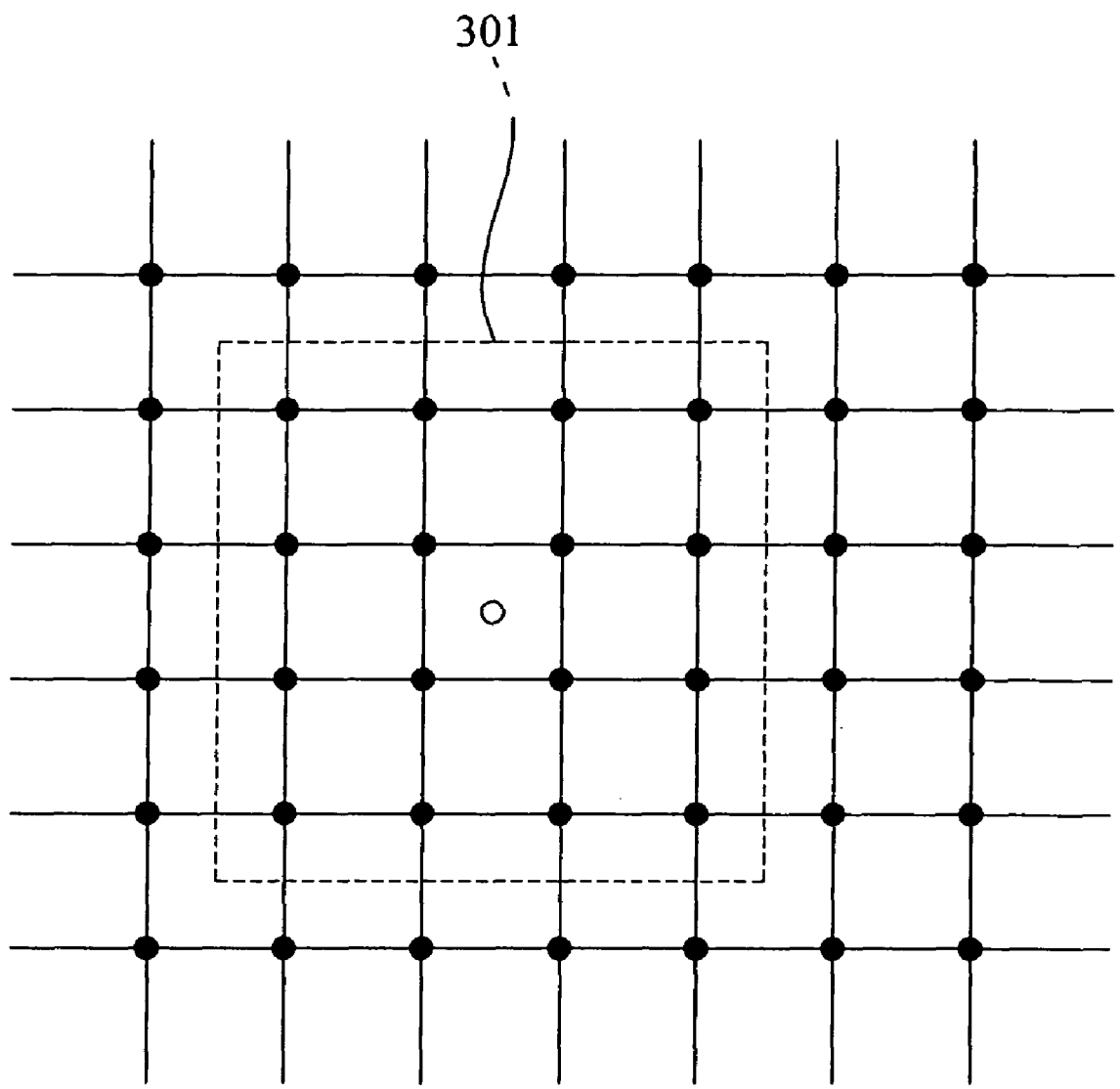
FIG. 3 is a diagram illustrating operations of a pixel replacement unit of FIG. 1.

Referring to FIG. 3, the interpolation direction determination unit 103 may determine whether all pixels within an interpolation window 301 correspond to edges and determine an interpolation direction based on a location of an interpolation pixel when a pixel corresponding to the edge exists in the interpolation window 301. Here, the interpolation direction determination unit 103 may divide the interpolation window 301 into a diagonal direction, a vertical direction, and a horizontal direction according to the location of the interpolation pixel to determine the interpolation direction.

The pixel replacement unit 104 may replace a pixel value of each pixel using a pixel value of an adjacent pixel within the interpolation window 301 after dividing the interpolation window 301 based on the interpolation pixel, according to the interpolation direction.

Figure 4:
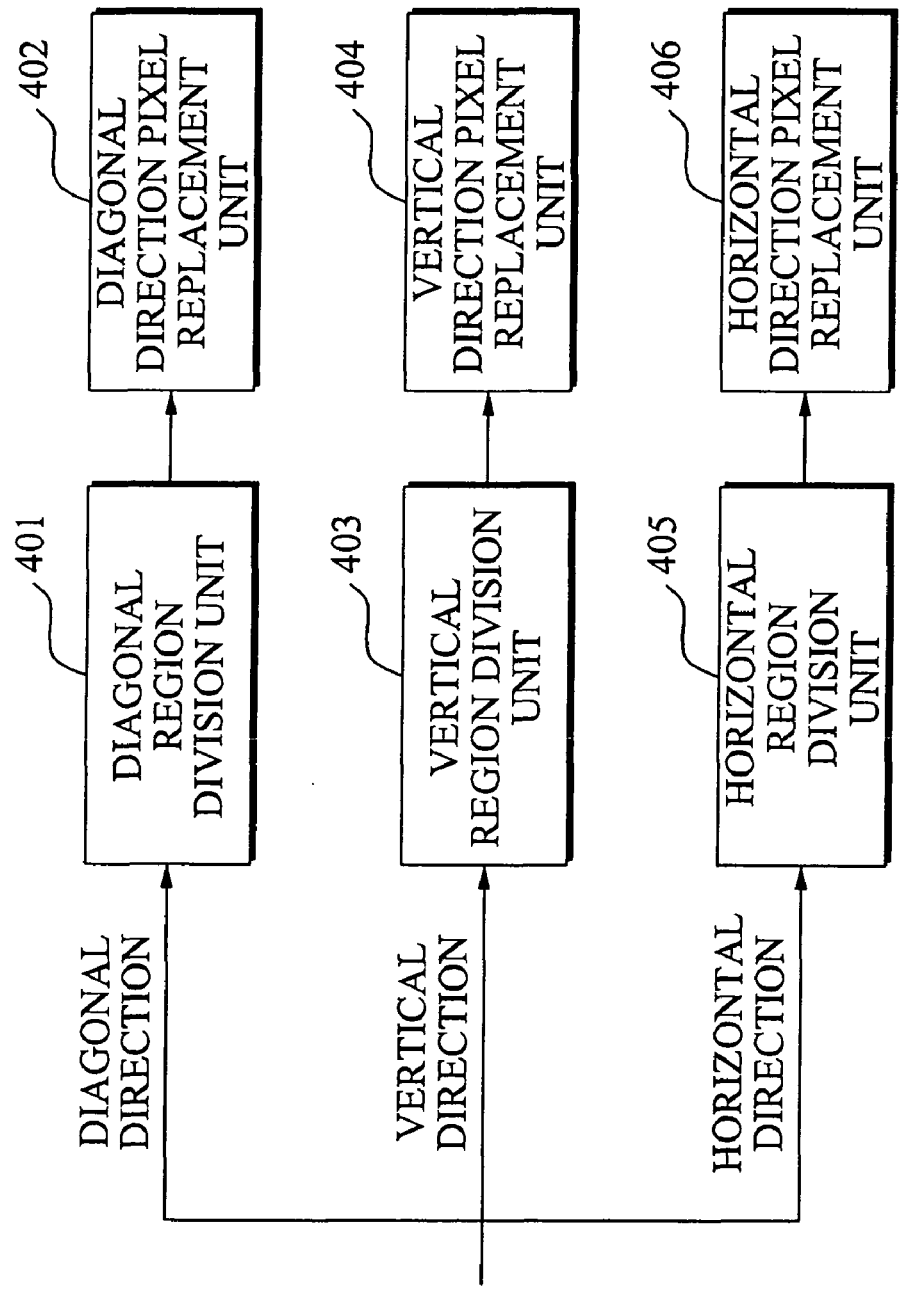
FIG. 4 is a block diagram illustrating the pixel replacement unit of FIG. 1.

FIG. 4 is a block diagram illustrating the pixel replacement unit 104 of FIG. 1.

Referring to FIG. 4, the pixel replacement unit 104 may include a diagonal region division unit 401 and a diagonal direction pixel replacement unit 402, with respect to a diagonal interpolation direction. With respect to a vertical interpolation direction, the pixel replacement unit 104 may include a vertical region division unit 403 and a vertical direction pixel replacement unit 404. The pixel replacement unit 104 may include a horizontal region division unit 405 and a horizontal direction pixel replacement unit 406, with respect to a horizontal interpolation direction.

Figure 5:
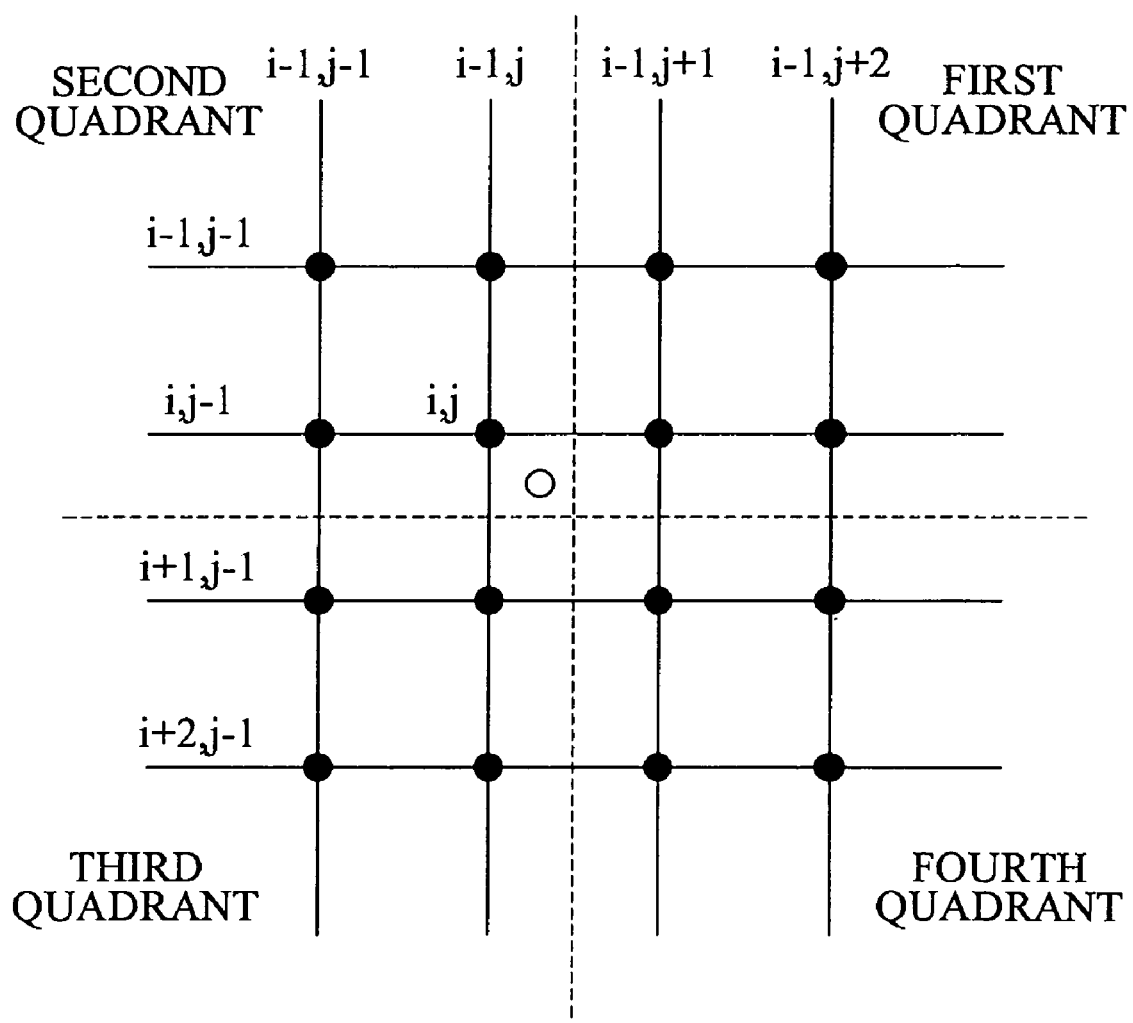
FIG. 5 is a diagram illustrating operations of a diagonal region division unit of FIG. 4.
Figure 6:
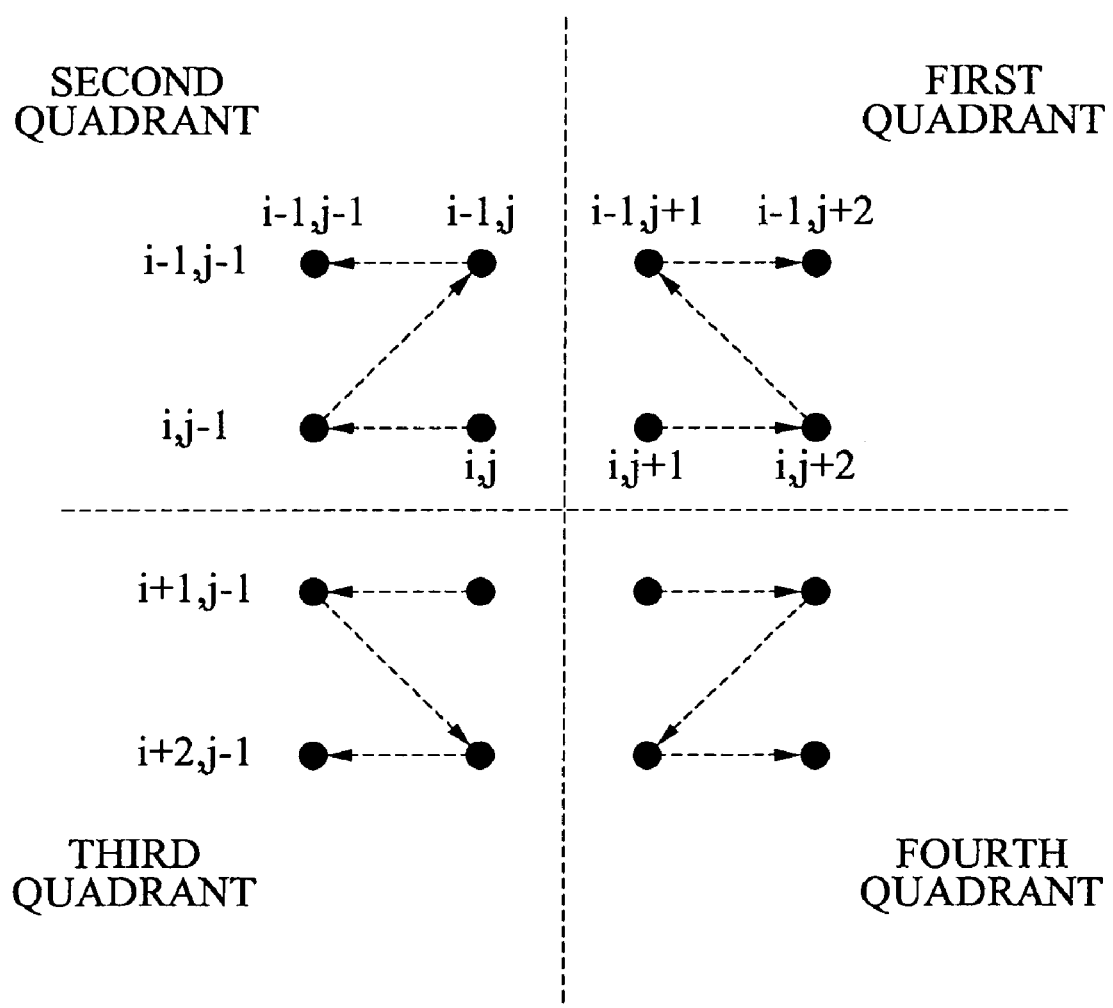
FIG. 6 is a diagram illustrating operations of a diagonal direction pixel replacement unit of FIG. 4.

FIG. 5 is a diagram illustrating operations of the diagonal region division unit 401 of FIG. 4, and FIG. 6 is a diagram illustrating operations of the diagonal direction pixel replacement unit 402 of FIG. 4.

Referring to FIG. 5, the diagonal region division unit 401 may divide an interpolation window into quadrants based on an interpolation pixel.

Referring to FIG. 6, the diagonal direction pixel replacement unit 402 may classify a pixel into a participant pixel and a non-participant pixel according to whether the pixel included in a quadrant corresponds to an edge, and replace a pixel value of the non-participant pixel using a pixel value of the participant pixel. Here, the pixel value may indicate a brightness value of a corresponding pixel.

The diagonal direction pixel replacement unit 402 may determine whether the pixel included in each of the quadrants corresponds to an edge in an order of being adjacent to the pixel to be interpolated, and may classify the pixel into the participant pixel and the non-participant pixel.

As an example, when pixels $(i, j+1)$, $(i, j+2)$, $(i-1, j+1)$, and $(i-1, j+2)$ exist in a first quadrant, the diagonal direction pixel replacement unit 402 may determine whether the pixel $(i, j+1)$ that is most adjacent to an interpolation pixel corresponds to an edge, and sequentially determine whether the pixels $(i, j+2)$, $(i-1, j+1)$, and $(i-1, j+2)$ correspond to edges. Here, the determination orders for remaining pixels except for the pixel $(i, j+1)$ may be changed.

The diagonal direction pixel replacement unit 402 may empty all pixels $(i, j+1)$, $(i, j+2)$, $(i-1, j+1)$, and $(i-1, j+2)$ and classify corresponding pixels as non-participant pixels when the pixel $(i, j+1)$ corresponds to the edge. When the pixel $(i, j+1)$ does not correspond to the edge, the diagonal direction pixel replacement unit 402 may classify the pixel $(i, j+1)$ as a participant pixel, move to the pixel $(i, j+2)$, and determine whether the pixel $(i, j+2)$ corresponds to an edge. In this instance, when the pixel $(i, j+2)$ does not correspond to the edge, the diagonal direction pixel replacement unit 402 may classify the pixel $(i, j+2)$ as a participant pixel, and when the pixel $(i, j+2)$ corresponds to an edge, the diagonal direction pixel replacement unit 402 may empty a pixel value of the pixel $(i, j+2)$ and determine the pixel $(i, j+2)$ as a non-participant pixel. Subsequently, the diagonal direction pixel replacement unit 402 may move to the pixel $(i-1, j+1)$ and classify the pixel $(i-1, j+1)$ as a participant pixel when the pixel $(i-1, j+1)$ does not correspond to an edge, and may empty a pixel value of the pixel $(i-1, j+1)$ and classify the pixel $(i-1, j+1)$ as a non-participant pixel when the pixel $(i-1, j+1)$ corresponds to an edge. Subsequently, the diagonal direction pixel replacement unit 402 may move to the pixel $(i-1, j+2)$ and classify the pixel $(i-1, j+2)$ as a participant pixel when the pixel $(i-1, j+2)$ does not correspond to an edge, and may empty a pixel value of the pixel $(i-1, j+2)$ and classify the pixel $(i-1, j+2)$ as a non-participant pixel when the pixel $(i-1, j+2)$ corresponds to an edge.

In this instance, the emptying of the pixel values of the pixels may denote temporarily removing the pixel values in order to replace the pixel values with other pixel values.

By independently performing the above operations in a second quadrant, a third quadrant, and a fourth quadrant, all pixels included in the interpolation window may be classified into the participant pixels and the non-participant pixels.

The diagonal direction pixel replacement unit 402 may calculate a new pixel value of the non-participant pixels using the pixel value of the participant pixels after classifying the pixels within the interpolation window into the participant pixels and the non-participant pixels. As an example, the diagonal direction pixel replacement unit 402 may calculate an average pixel value of the participant pixels and replace the pixel value of all non-participant pixels with the calculated average pixel value.

Figure 7:
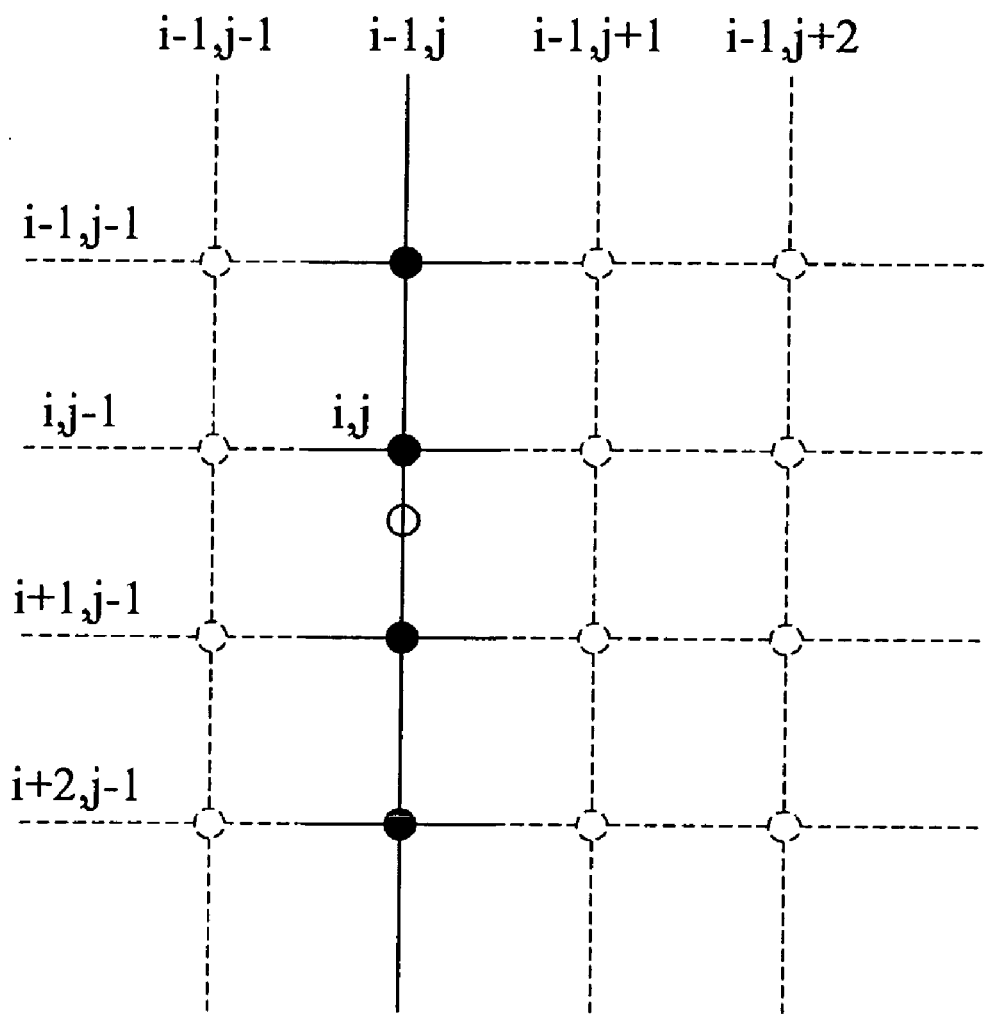
FIG. 7 is a diagram illustrating operations of a vertical region division unit of FIG. 4.

FIG. 7 is a diagram illustrating operations of the vertical region division unit 403 of FIG. 4, and FIG. 8 is a diagram illustrating operations of the vertical direction pixel replacement unit 404 of FIG. 4.

Referring to FIG. 7, the vertical region pixel division unit 403 may divide a portion of the interpolation window in a vertical direction, based on the interpolation pixel. The vertical region pixel division unit 403 may use a pixel existing on a vertical line with respect to a line of the interpolation pixel among pixels included in the interpolation window when the interpolation direction is vertical.

The vertical direction pixel replacement unit 404 may replace a pixel value of a pixel within the divided interpolation window using a pixel value of an adjacent pixel within a corresponding region. The vertical direction pixel replacement unit 404 may determine a vertical arrangement type according to the pixel within a corresponding region, and replace the pixel value of the pixel in the corresponding region using a predetermined pixel replacement equation with respect to the vertical arrangement type.

As illustrated in FIG. 7, when an interpolation window of a 4×4 structure is used, the vertical region division unit 403 may divide a region including four pixels located in a vertical direction based on an interpolation pixel in an interpolation window.

Referring to FIG. 8, a vertical arrangement type of a pixel may be divided into six cases according to whether a pixel within the divided interpolation window corresponds to an edge.

The vertical direction pixel replacement unit 404 may replace a pixel value of a pixel within the divided interpolation window using a predetermined pixel replacement equation with respect to the vertical arrangement type.

In this instance, when the vertical arrangement type of the pixel within the divided interpolation window corresponds to a column (1) of FIG. 8, the pixel replacement equation may be defined by, $$\text{replacement of } (i-1, j) \text{ pixel} = \frac{(i, j) \text{ pixel} + (i+1, j) \text{ pixel}}{2} \quad \text{[Equation 2]}$$

$$\text{replacement of } (i+2, j) \text{ pixel} = \frac{(i, j) \text{ pixel} + (i+1, j) \text{ pixel}}{2}.$$

Also, when the vertical arrangement type of the pixel within the divided interpolation window corresponds to a column (2) of FIG. 8, the pixel replacement equation may be defined as Equation 3 below. According to Equation 3, pixel values of pixels $(i-1, j)$ and $(i+2, j)$ may be replaced with an average of a pixel value of $(i, j)$ and a pixel value of $(i+1, j)$.

$$\text{replacement of } (i-1, j) \text{ pixel} = \frac{(i, j) \text{ pixel} + (i+1, j) \text{ pixel}}{2}$$

$$\text{replacement of } (i+2, j) \text{ pixel} = \frac{(i, j) \text{ pixel} + (i+1, j) \text{ pixel}}{2}.$$

[Equation 3]

Also, when a vertical arrangement type of a pixel within the divided interpolation window corresponds to a column (3) of FIG. 8, a pixel replacement equation may be defined as Equation 4 below. According to Equation 4, pixel values of pixels (i−1, j) and (i, j) may be replaced with an average of a pixel value of (i+1, j) and a pixel value of (i+2, j).

$$\text{replacement of } (i-1, j) \text{ pixel} = \frac{(i+1, j) \text{ pixel} + (i+2, j) \text{ pixel}}{2}$$

$$\text{replacement of } (i, j) \text{ pixel} = \frac{(i+1, j) \text{ pixel} + (i+2, j) \text{ pixel}}{2}.$$

[Equation 4]

Also, when a vertical arrangement type of a pixel within the divided interpolation window corresponds to a column (4) of FIG. 8, a pixel replacement equation may be defined as Equation 5 below. According to Equation 5, pixel values of pixels (i−1, j), (i, j), and (i+2, j) may be replaced with a pixel value of (i+1, j).

replacement of(i−1,j)pixel=(i+1,j)pixel replacement of(i,j)pixel=(i+1,j)pixel replacement of(i+2,j)pixel=(i+1,j)pixel  [Equation 5]

Also, when a vertical arrangement type of a pixel within the divided interpolation window corresponds to a column (5) of FIG. 8, a pixel replacement equation may be defined as Equation 6 below. According to Equation 6, pixels values of (i+1, j) and (i+2, j) may be replaced with an average of a pixel value of (i−1, j) and a pixel value of (i, j).

$$\text{replacement of } (i+1, j) \text{ pixel} = \frac{(i-1, j) \text{ pixel} + (i, j) \text{ pixel}}{2}$$

$$\text{replacement of } (i+2, j) \text{ pixel} = \frac{(i-1, j) \text{ pixel} + (i, j) \text{ pixel}}{2}.$$

[Equation 6]

Also, when a vertical arrangement type of a pixel within the divided interpolation window corresponds to a column (6) of FIG. 8, a pixel replacement equation may be defined as Equation 7 below. According to Equation 7, pixel values of (i−1, j), (i+1, j), and (i+2, j) may be replaced with a pixel value of (i, j).

replacement of(i−1,j)pixel=(i,j)pixel replacement of(i+1,j)pixel=(i,j)pixel replacement of(i+2,j)pixel=(i,j)pixel.  [Equation 7]

Figure 9:
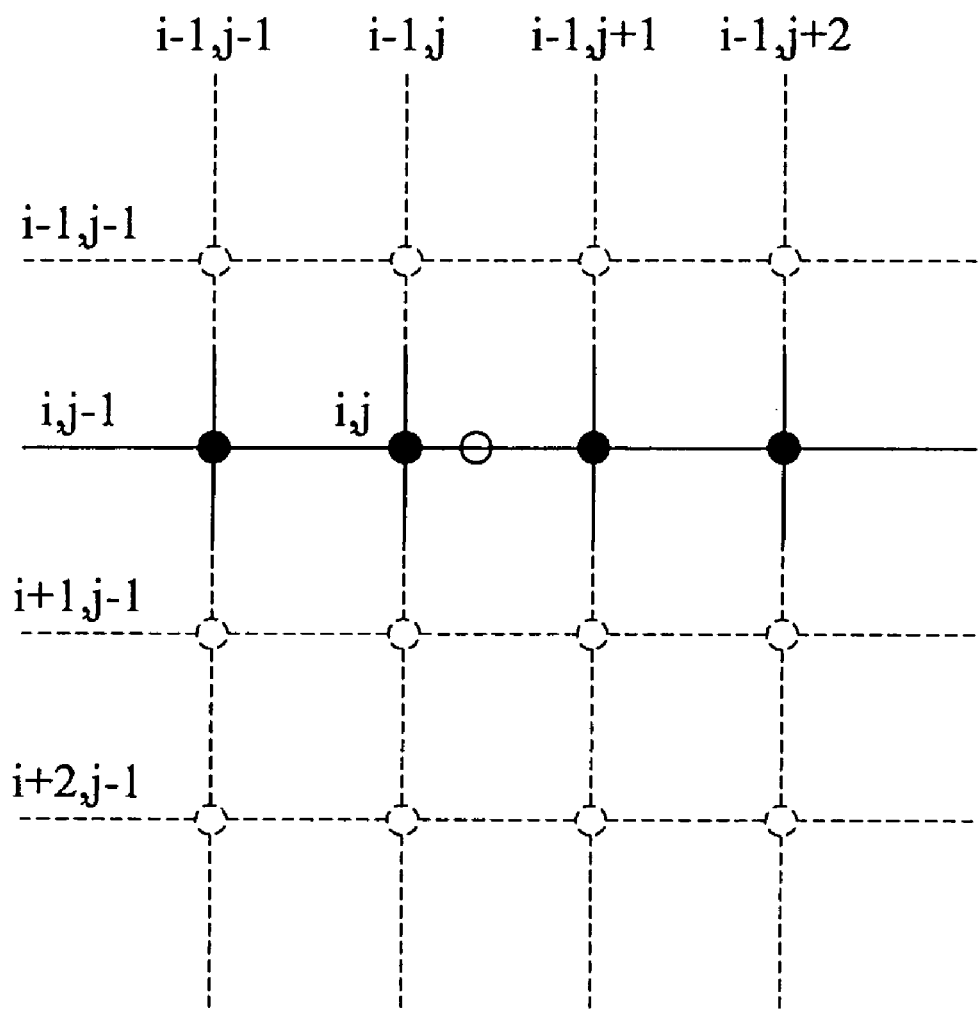
FIG. 9 is a diagram illustrating operations of a horizontal region division unit of FIG. 4.
Figure 10:
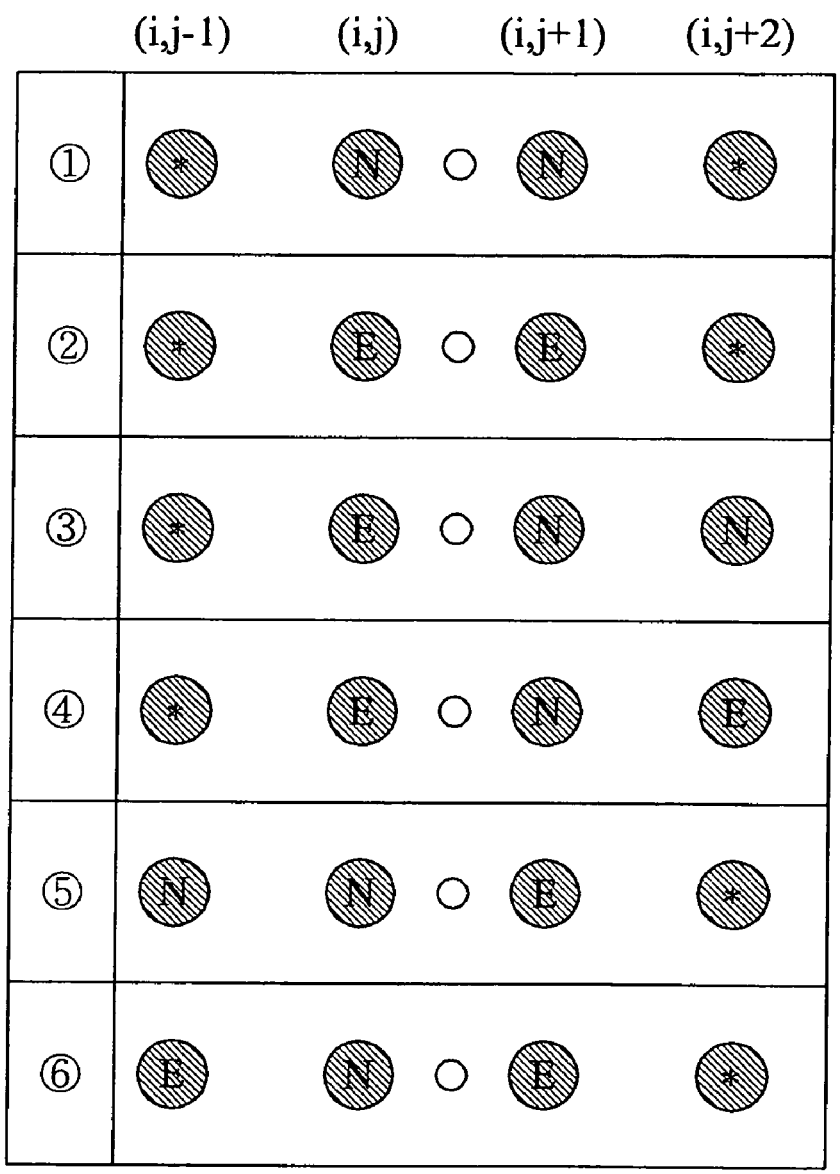
FIG. 10 is a diagram illustrating operations of a horizontal direction pixel replacement unit of FIG. 4.

FIG. 9 is a diagram illustrating operations of the horizontal region division unit 405 of FIG. 4, and FIG. 10 is a diagram illustrating operations of the horizontal direction pixel replacement unit 406 of FIG. 4.

Referring to FIG. 9, the horizontal region division unit 405 may divide a portion of the interpolation window in a horizontal direction based on the interpolation pixel. The horizontal region division unit 405 may use a pixel located on a horizontal line based on the interpolation pixel among pixels included in the interpolation window when an interpolation direction is horizontal.

The horizontal direction pixel replacement unit 406 may replace a pixel value of a pixel included in the divided interpolation window using a pixel value of an adjacent pixel within a corresponding region. The horizontal direction pixel replacement unit 406 may determine a horizontal arrangement type according to the pixel within the interpolation window, and may replace the pixel value of the pixel in the interpolation window using a predetermined pixel replacement equation with respect to the horizontal arrangement type.

As illustrated in FIG. 9, when an interpolation window of a 4×4 structure is used, the horizontal region division unit 405 may divide a region including four pixels located in a horizontal direction based on an interpolation pixel in an interpolation window.

Referring to FIG. 10, the horizontal arrangement type may be classified into six cases according to whether the pixel included in the interpolation window corresponds to the edge.

The horizontal direction pixel replacement unit 406 may replace a pixel value of the pixel included in the divided interpolation window using a predetermined pixel replacement equation with respect to each horizontal arrangement type.

In this instance, when a horizontal arrangement type of a pixel within the divided interpolation window corresponds to a row (1) of FIG. 10, a pixel replacement equation may be defined as Equation 8 below. According to Equation 8, pixel values of (i, j−1) and (i, j+2) may be replaced with an average of pixel values of (i, j) and (i, j+1).

$$\text{replacement of } (i, j-1) \text{ pixel} = \frac{(i, j) \text{ pixel} + (i, j+1) \text{ pixel}}{2}$$

$$\text{replacement of } (i, j+2) \text{ pixel} = \frac{(i, j) \text{ pixel} + (i, j+1) \text{ pixel}}{2}.$$

[Equation 8]

When a horizontal arrangement type of a pixel within the divided interpolation window corresponds to a row (2) of FIG. 10, a pixel replacement equation may be defined as Equation 9 below. According to Equation 9, pixel values of (i, j−1) and (i, j+2) may be replaced with an average of pixel values of (i, j) and (i, j+1).

$$\text{replacement of } (i, j-1) \text{ pixel} = \frac{(i, j) \text{ pixel} + (i, j+1) \text{ pixel}}{2}$$

$$\text{replacement of } (i, j+2) \text{ pixel} = \frac{(i, j) \text{ pixel} + (i, j+1) \text{ pixel}}{2}.$$

[Equation 9]

When a horizontal arrangement type of a pixel within the divided interpolation window corresponds to a row (3) of FIG. 10, a pixel replacement equation may be defined as Equation 10 below. According to Equation 10, pixel values of (i, j−1) and (i, j) may be replaced with an average of pixel values of (i, j+1) and (i, j+2).

$$\text{replacement of } (i, j-1) \text{ pixel} = \qquad \text{[Equation 10]}$$
$$\frac{(i, j+1) \text{ pixel} + (i, j+2) \text{ pixel}}{2}$$
$$\text{replacement of } (i, j) \text{ pixel} =$$
$$\frac{(i, j+1) \text{ pixel} + (i, j+2) \text{ pixel}}{2}.$$

When a horizontal arrangement type of a pixel within the divided interpolation window corresponds to a row (4) of FIG. 10, a pixel replacement equation may be defined as Equation 11 below. According to Equation 11, pixel values of (i, j−1), (i, j), and (i, j+2) may be replaced with a pixel value of (i, j+1).

$$\text{replacement of}(i,j-1)\text{pixel}=(i,j+1)\text{pixel}$$
$$\text{replacement of}(i,j)\text{pixel}=(i,j+1)\text{pixel}$$
$$\text{replacement of}(i,j+2)\text{pixel}=(i,j+1)\text{pixel}. \qquad \text{[Equation 11]}$$

When a horizontal arrangement type of a pixel within the divided interpolation window corresponds to a row (5) of FIG. 10, a pixel replacement equation may be defined as Equation 12 below. According to Equation 12, pixel values of (i, j+1) and (i, j+2) may be replaced with an average of a pixel value of (i, j−1) and a pixel value of (i, j).

$$\text{replacement of } (i, j+1) \text{ pixel} = \qquad \text{[Equation 12]}$$
$$\frac{(i, j-1) \text{ pixel} + (i, j) \text{ pixel}}{2}$$
$$\text{replacement of } (i, j+2) \text{ pixel} =$$
$$\frac{(i, j-1) \text{ pixel} + (i, j) \text{ pixel}}{2}.$$

When a horizontal arrangement type of a pixel within the divided interpolation window corresponds to a row (6) of FIG. 10, a pixel replacement equation may be defined as Equation 13 below. According to Equation 13, pixel values of (i, j−1), (i, j+1), and (i, j+2) may be replaced with a pixel value of (i, j).

$$\text{replacement of}(i,j-1)\text{pixel}=(i,j)\text{pixel}$$
$$\text{replacement of}(i,j+1)\text{pixel}=(i,j)\text{pixel}$$
$$\text{replacement of}(i,j+2)\text{pixel}=(i,j)\text{pixel}. \qquad \text{[Equation 13]}$$

The pixel replacement unit 104 of FIG. 4 replaces pixel values of pixels within the interpolation window by dividing the interpolation window according to the interpolation direction, thereby separating a pixel which may not be used for interpolation from pixels existing in the interpolation window and excluding the separated pixel value when interpolating. That is, the pixel replacement unit 104 may prevent image degrading due to a blurring phenomenon since a pixel having no relevance to an object being occupied by the interpolation pixel is separated.

When the dividing of the interpolation window and the replacing of the pixel are completed, the interpolation performance unit 105 may interpolate the interpolation pixel using the replaced pixel value.

Figure 11:
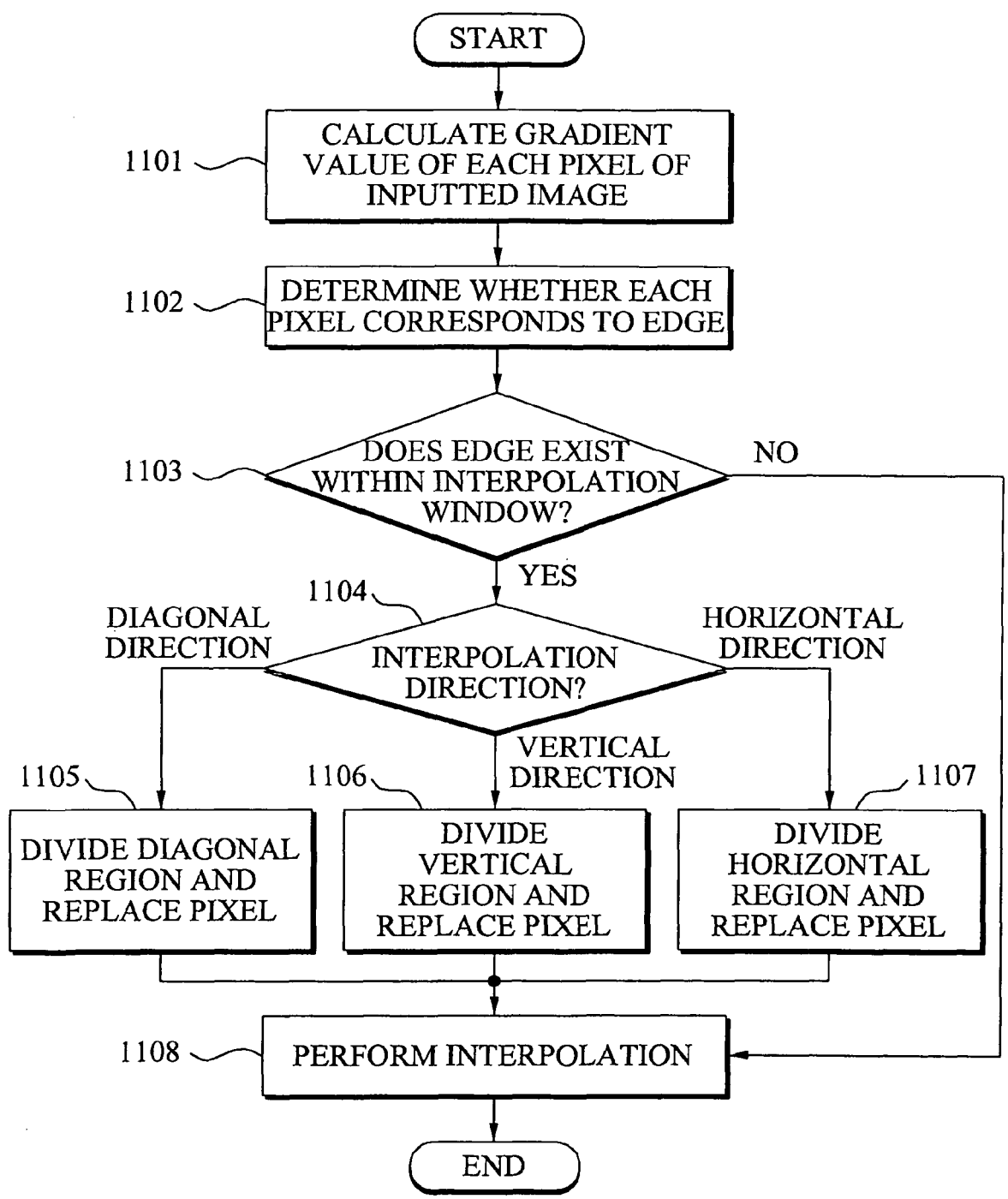
FIG. 11 is a flowchart illustrating operations of a method of interpolating an image according to embodiments.

FIG. 11 is a flowchart illustrating operations of a method of interpolating an image according to example embodiments.

In the embodiments, the method of interpolating the image may include the below operations.

In operation 1101, the method of interpolating the image may calculate a gradient value G of each pixel of an inputted image.

Here, operation 1101 may calculate the gradient value G of a corresponding pixel using a sum of an absolute value of a horizontal gradient value Gx and a vertical gradient value Gy after calculating the horizontal gradient value Gx and the vertical gradient value Gy with respect to the corresponding pixel.

In operation 1102, the method of interpolating the image may determine whether the gradient value G of the corresponding pixel corresponds to an edge after a thinning process.

Operation 1102 may include operations as below.

Figure 12:
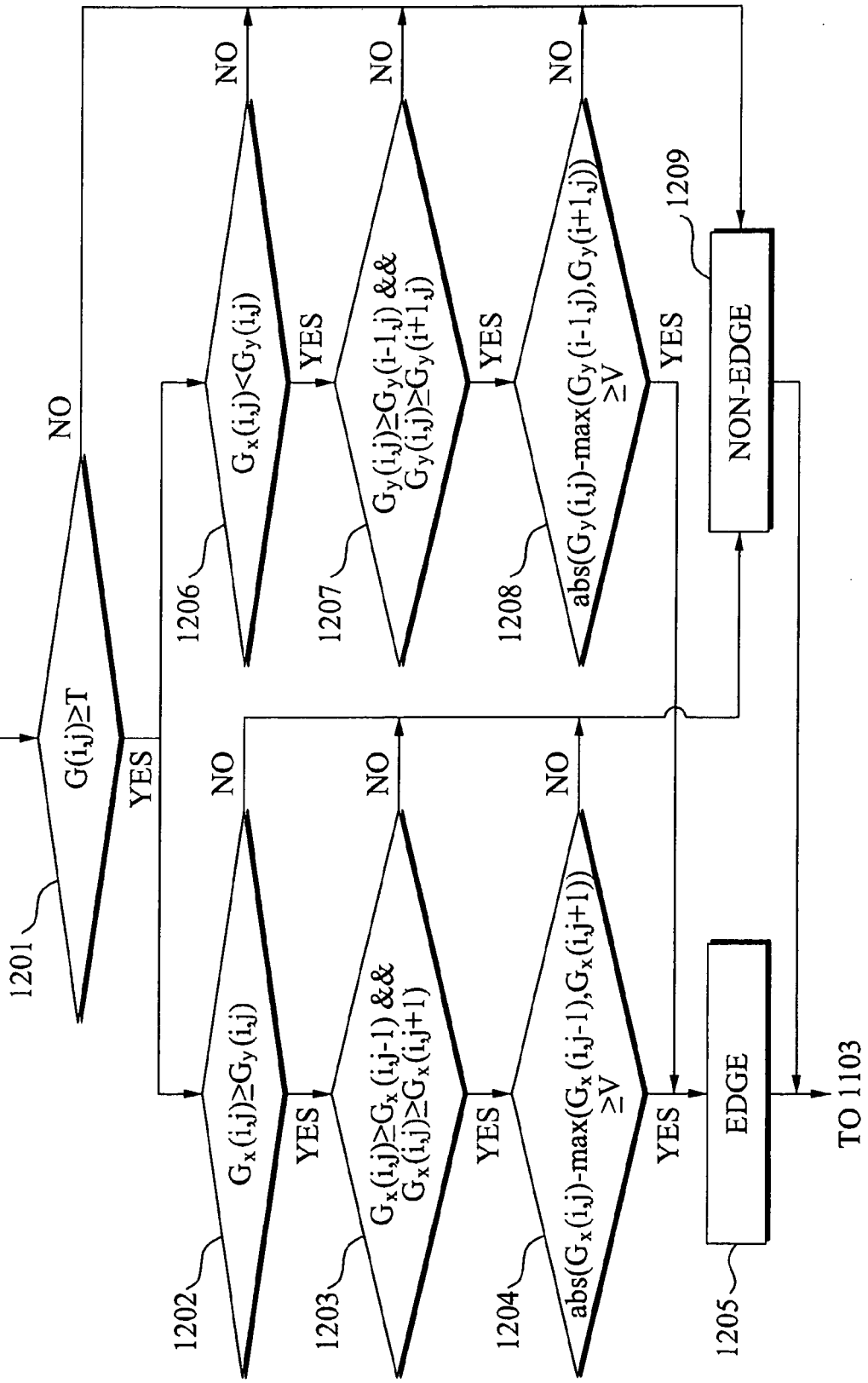
FIG. 12 is a flowchart illustrating operations of determining whether a pixel corresponds to an edge, shown in FIG. 11.

Referring to FIG. 12, operation 1102 may determine whether the corresponding pixel corresponds to the edge when a first condition of operation 1201, a second condition of operation 1202, a third condition of operation 1203, and a fourth condition of operation 1204 are simultaneously satisfied.

As an example, the first condition of operation 1201 is that a gradient value G of corresponding pixels i and j are required to be equal to or greater than a threshold T. The second condition of operation 1202 is that a horizontal gradient value Gx(i, j) is required to be equal to or greater than a vertical gradient value Gy(i, j). The third condition of operation 1203 is that the horizontal gradient value Gx(i, j) is required to be equal to or greater than a horizontal gradient value Gx(i, j−1) of a left pixel (i, j−1) being adjacent to a corresponding pixel and a horizontal gradient value Gx(i, j+1) of a right pixel (i, j+1). The fourth condition of operation 1204 is that an absolute value of a difference between a greater of the horizontal gradient value Gx(i, j−1) of the left pixel (i, j−1) and the horizontal gradient value Gx(i, j+1) of the right pixel (i, j+1) and the horizontal gradient value Gx(i, j) is required to be equal to or greater than a set value V.

Operation 1102 may determine that the corresponding pixel corresponds to the edge when the first condition of operation 1201, a fifth condition of operation 1206, a sixth condition of operation 1207, and a seventh condition of operation 1208 are simultaneously satisfied in operation 1205.

As an example, the fifth condition of operation 1206 is that a vertical gradient value Gy(i, j) is required to be greater than the horizontal gradient value Gx(i, j). The sixth condition of operation 1207 is that the vertical gradient value Gy(i, j) is required to be equal to or greater than a vertical gradient value Gy(i−1, j) of an upper pixel (i−1, j) and a vertical gradient value Gy(i+1, j) of a lower pixel (i+1, j). The seventh condition of operation 1208 is that an absolute value of a difference between a greater of the vertical gradient value Gy(i−1,j) of the upper pixel (i−1, j) and the vertical gradient value Gy(i+1, j) of the lower pixel (i+1, j) and the vertical gradient value Gy(i, j) of the corresponding pixel (i, j) is required to be equal to or greater than a set value V.

Operation 1102 may determine that the corresponding pixel corresponds to a non-edge when any one of the first condition of operation 1201 through the fourth condition of operation 1204 and the fifth condition of operation 1206 through the seventh condition of operation 1208 is not satisfied.

Consequently, operation 1102 may determine that the corresponding pixel corresponds to the edge when the gradient value of the corresponding pixel is equal to or greater than the threshold T and satisfies other conditions at the same time, however, operation 1102 may determine that the corresponding pixel corresponds to the non-edge when any one condition is not satisfied.

Referring back to FIG. 11, the method of interpolating the image may determine whether a pixel corresponding to the edge within the interpolation window exists in operation 1103, and may determine an interpolation direction according to a location of an interpolation pixel within the interpolation window in operation 1104 when the edge exists in the interpolation window.

In this instance, operation 1104 may divide the interpolation direction into a diagonal direction, a vertical direction, and a horizontal direction according to the location of the interpolation pixel.

Also, the method of interpolating the image may perform a region division and a pixel replacement with respect to a diagonal direction when the interpolation direction is diagonal in operation 1105.

Operation 1105 may include the below operations.

Figure 13:
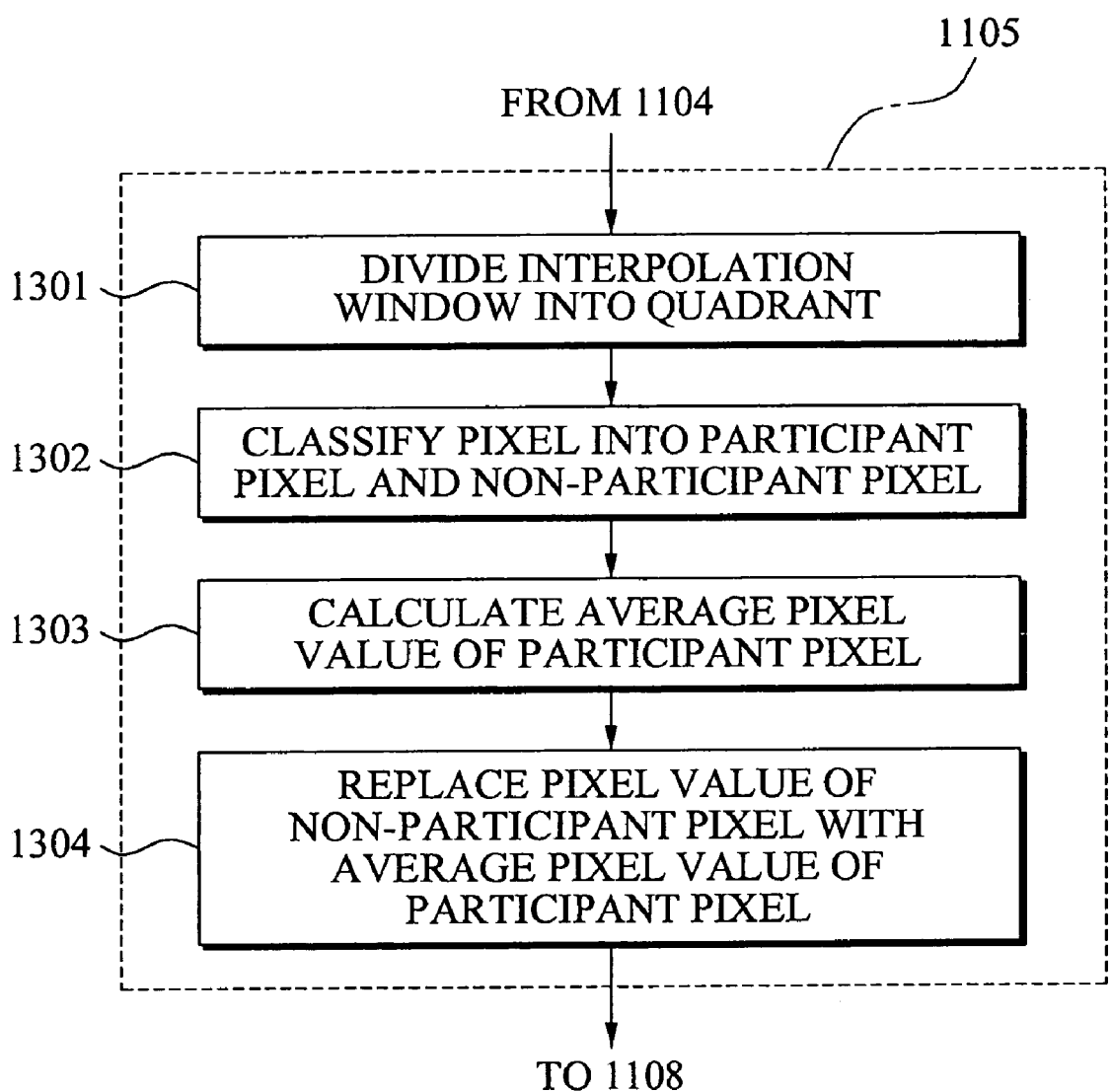
FIG. 13 is a flowchart illustrating operations of a region division and a pixel replacement with respect to a diagonal direction, shown in FIG. 11.

Referring to FIG. 13, operation 1105 may divide the interpolation window into quadrants based on the interpolation pixel in operation 1301.

In operation 1302, operation 1105 may classify a pixel included in each of the quadrants according to whether the pixel corresponds to an edge into one of a participant pixel and a non-participant pixel. Here, operation S1302 of the classifying of the pixel into the participant pixel and the non-participant pixel may be independently performed in each of the quadrants, and the pixel may be classified into one of the participant pixel and the non-participant pixel by determining whether the pixel corresponds to the edge in an order of being adjacent to the pixel to be interpolated.

Also, operation 1105 may replace a pixel value of the non-participant pixels using a pixel value of the participant pixels. Here, the replacing of the pixel value of the pixel may calculate an average pixel value of all participant pixels within the interpolation window in operation 1303, and replace the pixel values of all non-participant pixels with the calculated average pixel value in operation 1304.

Referring back to FIG. 11, the method of interpolating the image may perform a region division and a pixel replacement with respect to a vertical direction when the interpolation direction is vertical in operation 1106.

Operation 1106 may include the below operations.

Figure 14:
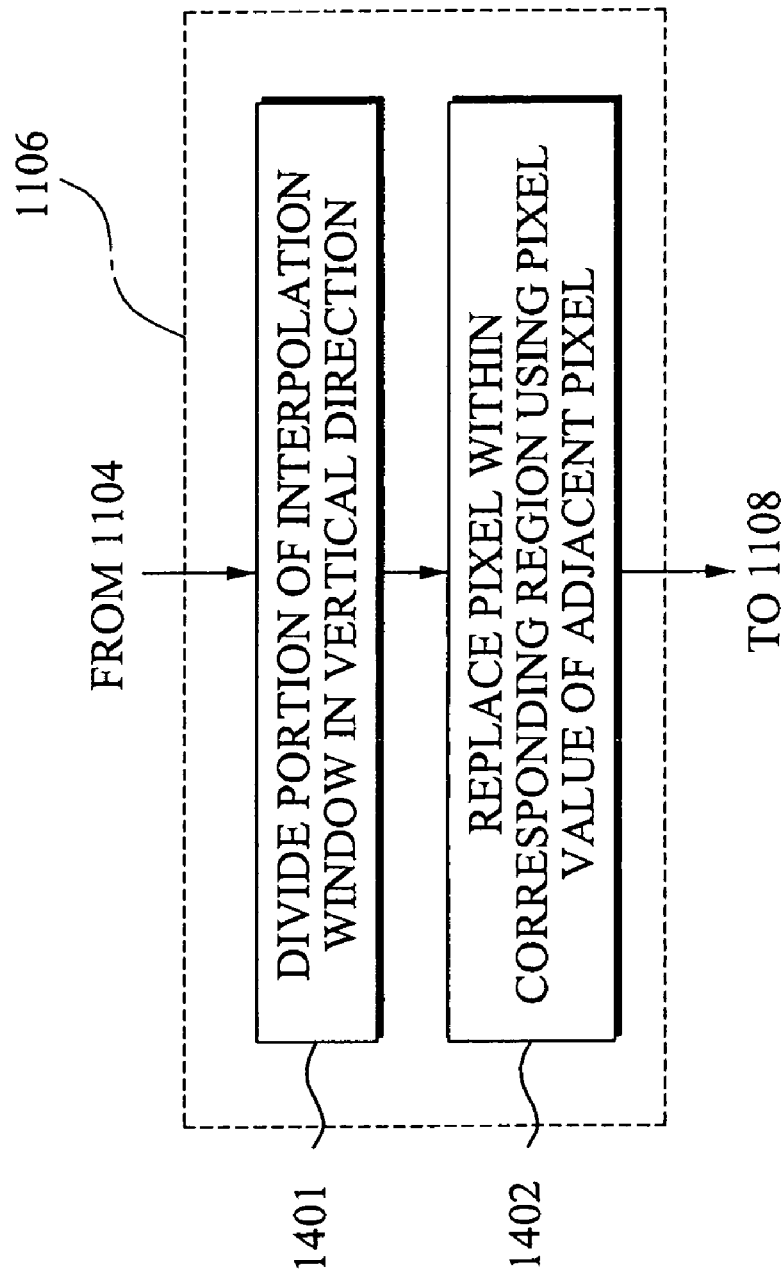
FIG. 14 is a flowchart illustrating operations of a region dividing and a pixel replacement with respect to a vertical direction, shown in FIG. 11.

Referring to FIG. 14, operation 1106 may divide a portion of the interpolation window in a vertical direction based on the interpolation pixel in operation 1401. Here, the dividing of the portion of the interpolation window of operation 1401 may divide a region including a pixel located on a vertical line based on the interpolation line among pixels included in the interpolation window.

Also, operation 1106 may replace a pixel value of the pixel included in the divided interpolation window using a pixel value of an adjacent pixel within a corresponding region in operation 1402. In this instance, operation 1402 may determine a vertical arrangement type according to the pixel within the interpolation window, and may replace the pixel value of the pixel in the interpolation window using a predetermined pixel replacement equation with respect to the vertical arrangement type.

Referring back to FIG. 11, the method of interpolating the image may perform a region division and a pixel replacement with respect to a horizontal direction when the interpolation direction is horizontal in operation 1107.

Operation 1107 may include the below operations.

Figure 15:
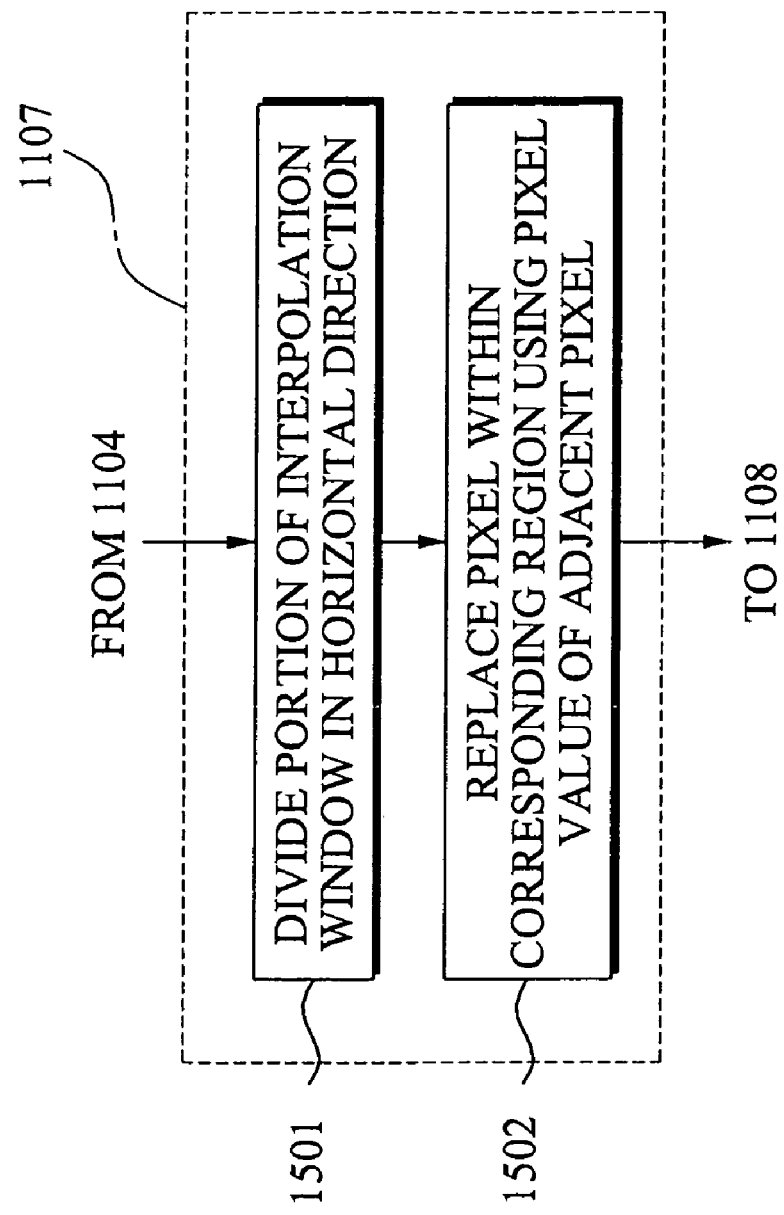
FIG. 15 is a flowchart illustrating operations of a region division and a pixel replacement with respect to a horizontal direction, shown in FIG. 11.

Referring to FIG. 15, operation 1107 may divide a portion of the interpolation window in a horizontal direction based on the interpolation pixel. In this instance, the dividing of the portion of the interpolation window may divide a region including a pixel located on a horizontal line based on the interpolation pixel among pixels included in the interpolation window.

Also, operation 1107 may replace the pixel value of the pixel included in the divided interpolation window using a pixel value of an adjacent pixel within the corresponding region in operation 1502. In this instance, operation 1502 may determine a horizontal arrangement type according to the pixel within the interpolation window, and may replace the pixel value of the pixel in the interpolation window using a predetermined pixel replacement equation with respect to the horizontal arrangement type.

Referring back to FIG. 11, the method of interpolating the image may perform interpolation with respect to the interpolation pixel using the replaced pixel value when the region division and the pixel replacement are completed according to the interpolation direction in operation 1108.

Consequently, the method of interpolating the image may prevent occurrence of a thick edge via a thinning process and precisely process regions divided depending on an edge via the region division and the pixel replacement according to the interpolation direction, thereby providing a high resolution image with higher quality.

The method of interpolating the image according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. An apparatus to interpolate an image, the apparatus comprising:
    a gradient calculation unit to calculate a gradient value of each pixel of an inputted image;
    an edge determination unit to determine whether the pixel corresponds to an edge by using the gradient value;
    an interpolation direction determination unit to determine an interpolation direction according to a location of a pixel to be interpolated within an interpolation window when a pixel corresponding to an edge is determined to exist in the interpolation window;

a pixel replacement unit to divide the interpolation window according to the interpolation direction based on the pixel to be interpolated and to replace a pixel value within the divided interpolation window using pixel values of adjacent pixels; and an interpolation performance unit to interpolate the pixel to be interpolated using the replaced pixel value.

2. The apparatus of claim 1, wherein the gradient calculation unit calculates the gradient value of the pixel using a horizontal gradient value and a vertical gradient value with respect to the pixel.

3. The apparatus of claim 1, wherein the edge determination unit determines whether the pixel corresponds to an edge based on a comparison result of the horizontal gradient value and the vertical gradient value.

4. An apparatus to interpolate an image, the apparatus comprising:

a gradient calculation unit to calculate a gradient value of each pixel of an inputted image;

an edge determination unit to determine whether the pixel corresponds to an edge by using the gradient value;

an interpolation direction determination unit to determine an interpolation direction according to a location of a pixel to be interpolated within an interpolation window when a pixel corresponding to an edge is determined to exist in the interpolation window;

a pixel replacement unit to divide the interpolation window according to the interpolation direction based on the pixel to be interpolated and replacing a pixel value within the divided interpolation window using pixel values of adjacent pixels; and an interpolation performance unit to interpolate the pixel to be interpolated using the replaced pixel value, wherein the pixel replacement unit comprises:

a diagonal region division unit to divide the interpolation window into quadrants based on the pixel to be interpolated when the interpolation direction is determined to be diagonal; and a diagonal direction pixel replacement unit to classify pixels included in each of the quadrants according to whether the pixels correspond to an edge into one of a participant pixel and a non-participant pixel, and replacing a pixel value of the non-participant pixels using a pixel value of the participant pixels.

5. The apparatus of claim 4, wherein the diagonal direction pixel replacement unit determines whether the pixels included in each of the quadrants correspond to an edge in an order of being adjacent to the pixel to be interpolated, and classifies the pixels into one of the participant pixel and the non-participant pixel based on the determination as to whether the pixels correspond to an edge.

6. An apparatus to interpolate an image, the apparatus comprising:

a gradient calculation unit to calculate a gradient value of each pixel of an inputted image;

an edge determination unit to determine whether the pixel corresponds to an edge by using the gradient value;

an interpolation direction determination unit to determine an interpolation direction according to a location of a pixel to be interpolated within an interpolation window when a pixel corresponding to an edge is determined to exist in the interpolation window;

a pixel replacement unit to divide the interpolation window according to the interpolation direction based on the pixel to be interpolated and replacing a pixel value within the divided interpolation window using pixel values of adjacent pixels; and an interpolation performance unit to interpolate the pixel to be interpolated using the replaced pixel value, wherein the pixel replacement unit comprises:

a vertical region division unit to divide a portion of the interpolation window in a vertical direction based on the pixel to be interpolated when the interpolation direction is determined to be vertical; and a vertical direction pixel replacement unit to replace a pixel value of a pixel within the divided interpolation window using a pixel value of an adjacent pixel.

7. The apparatus of claim 6, wherein the vertical direction pixel replacement unit determines a vertical arrangement type according to the pixel within the interpolation window, and replaces the pixel value of the pixel in the interpolation window using a predetermined pixel replacement equation with respect to the vertical arrangement type.

8. An apparatus to interpolate an image, the apparatus comprising:

a gradient calculation unit to calculate a gradient value of each pixel of an inputted image;

an edge determination unit to determine whether the pixel corresponds to an edge by using the gradient value;

an interpolation direction determination unit to determine an interpolation direction according to a location of a pixel to be interpolated within an interpolation window when a pixel corresponding to an edge is determined to exist in the interpolation window;

a pixel replacement unit to divide the interpolation window according to the interpolation direction based on the pixel to be interpolated and replacing a pixel value within the divided interpolation window using pixel values of adjacent pixels; and an interpolation performance unit to interpolate the pixel to be interpolated using the replaced pixel value, wherein the pixel replacement unit comprises:

a horizontal region division unit to divide a portion of the interpolation window in a horizontal direction based on the pixel to be interpolated when the interpolation direction is determined to be horizontal; and a horizontal direction pixel replacement unit to replace the pixel value of the pixel within the divided interpolation window using the pixel value of an adjacent pixel.

9. The apparatus of claim 8, wherein the horizontal direction pixel replacement unit determines a horizontal arrangement type according to the pixel within the interpolation window, and replaces the pixel value of the pixel in the interpolation window using a predetermined pixel replacement equation with respect to the horizontal arrangement type.

10. A method of interpolating an image, the method comprising:

calculating, by a processor, a gradient value of each pixel of the inputted image;

determining an interpolation direction according to a location of a pixel to be interpolated within an interpolation window when a pixel corresponding to an edge is determined to exist in the interpolation window, based on the calculated gradient value;

dividing the interpolation window according to the interpolation direction based on the pixel to be interpolated, and replacing a pixel value within the interpolation window; and interpolating the pixel to be interpolated using the replaced pixel value.

11. The method of claim 10, wherein the calculating of the gradient value calculates the gradient value of the pixel using a horizontal gradient value and a vertical gradient value with respect to the pixel.

12. The method of claim 10, wherein the determining the interpolation direction determines whether the pixel corresponds to an edge based on a comparison result of the horizontal gradient value and the vertical gradient value.

13. The method of claim 10, wherein the replacing of the pixel value within the interpolation window comprises:
    dividing the interpolation window into quadrants based on the pixel to be interpolated when the interpolation direction is determined to be diagonal; and
    classifying the pixels included in each of the quadrants according to whether the pixels correspond to an edge into one of a participant pixel and a non-participant pixel, and replacing a pixel value of the non-participant pixels using a pixel value of the participant pixels.

14. The method of claim 13, wherein the classifying determines whether the pixels included in each of the quadrants correspond to an edge in an order of being adjacent to the pixel to be interpolated, and classifies the pixels into one of the participant pixel and the non-participant pixel based on the determination as to whether the pixels correspond to an edge.

15. The method of claim 10, wherein the replacing of the pixel value in the interpolation window comprises:
    dividing a portion of the interpolation window in a vertical direction based on the pixel to be interpolated when the interpolation direction is determined to be vertical; and
    replacing a pixel value within the divided interpolation window using a pixel value of an adjacent pixel.

16. The method of claim 15, wherein the replacing of the pixel value within the divided interpolation window using the pixel value of the adjacent pixel determines a vertical arrangement type according to the pixel included in the interpolation window, and replaces the pixel value in the interpolation window using a predetermined pixel replacement equation with respect to the vertical arrangement type.

17. The method of claim 10, wherein the replacing of the pixel value of the pixel within the interpolation window comprises:
    dividing a portion of the interpolation window in a horizontal direction based on the pixel to be interpolated when the interpolation direction is determined to be horizontal; and
    replacing the pixel value within the divided interpolation window using the pixel value of the adjacent pixel.

18. The method of claim 17, wherein the replacing of the pixel value within the divided interpolation window using the pixel value of the adjacent pixel determines a horizontal arrangement type according to the pixel included in the interpolation window, and replaces the pixel value in the interpolation window using a predetermined pixel replacement equation with respect to the horizontal arrangement type.

19. A computer-readable storage medium storing instructions to implement the method of claim 10.

20. A method of interpolating an image, the method comprising:
    calculating, by a processor, a gradient value of each pixel of the inputted image, and determining whether each pixel corresponds to an edge according to the gradient value;
    determining an interpolation direction according to a location of a pixel to be interpolated within an interpolation window when it is determined that a respective pixel corresponds to the edge;
    dividing the interpolation window into portions, the dividing being in the direction of the determined interpolation direction, and replacing a pixel value within the interpolation window; and
    interpolating the pixel to be interpolated using the replaced pixel value.

* * * * *